United States Patent

[11] 3,628,843

[72] Inventors Donald T. Wynne
Cleveland, Ohio;
David E. Workman, Los Angeles, Calif.;
Joseph W. Kneier, Chesterland, Ohio
[21] Appl. No. 874,774
[22] Filed Nov. 7, 1969
[45] Patented Dec. 21, 1971
[73] Assignee Pendleton Tool Industries, Inc.
Los Angeles, Calif.

[54] CONTAINER FOR FISHING TACKLE OR THE LIKE
8 Claims, 3 Drawing Figs.

[52] U.S. Cl. .................................................. 312/294,
206/16, 312/272, 312/312
[51] Int. Cl. ....................................................... A47b 57/24
[50] Field of Search.......................................... 206/16, 4;
220/97, 29; 312/306, 308, 310, 311, 309, 312, 272

[56] References Cited
UNITED STATES PATENTS
1,614,910 1/1927 Yarder ......................... 206/16 E
1,976,765 10/1934 Berry............................. 206/16 E
2,851,188 9/1958 Pavelle.......................... 220/97
3,305,076 2/1967 Fleenor......................... 206/16
3,432,025 3/1969 Luhe............................. 220/16
3,493,102 2/1970 Belokin, Jr. .................. 206/16

Primary Examiner—James T. McCall
Attorneys—Carl R. Horten, David W. Tibbott and Frank H. Thomson ABSTRACT: A container for carrying fishing or hunting supplies or for use as a tool box, sewing chest or various industrial uses. A large container or case is provided with supports on which a tray is removably mounted. The tray is provided with divider ribs which are adapted to hold small articles containers. A handle is pivotally mounted on the tray and serves to assist in the removal of the tray from the container and to prevent the small article containers from becoming jumbled when the container is closed. The supports for the tray are spaced from the bottom of the box so that large articles may be carried in the box below the tray.

PATENTED DEC 21 1971  3,628,843

INVENTORS
DONALD T. WYNNE
DAVID E. WORKMAN
JOSEPH W. KNEIER
BY Frank H. Thomson
ATTORNEY

3,628,843

CONTAINER FOR FISHING TACKLE OR THE LIKE

BACKGROUND OF THE INVENTION

This invention relates to containers or cases which can be used for carrying both large and small articles and in particular to containers for carrying fishing tackle such as reels, lures, hooks and the like.

Prior to the present invention, most tackle boxes included a large container with cantilevered or linked trays which would swing upwardly when the box was opened to expose the lower half of the box. These trays are compartmentalized and used for carrying small articles such as lures and hooks. Large articles can be carried in the lower half of the box. Tackle boxes such as these have the disadvantage that the entire tackle box must be carried from place to place even through the user may wish only to use some of the small articles. In the event the tackle box was dropped or for some reason upset, the small articles often become entangled with each other. In addition, the number of compartments which can be placed in the trays of prior tackle boxes is limited. By their very nature, it is desirable to carry fish lures and the like in individual compartments in order to avoid entanglement. Hence, with prior tackle boxes, the number of small articles which can be neatly carried is limited.

Compartmentalized small article containers for carrying fishing tackle have long been known. Prior to the present invention, however, no suitable tackle box has been available which provided a convenient carrying arrangement for these small article containers. With prior tackle boxes, it is necessary to place these small article containers in the area of the tackle box designed for carrying large articles. This substantially reduces the amount of space which can be used for larger articles such as fishing reels.

SUMMARY

It is therefore the principle object of this invention to provide a container or case which can be used for carrying both large and small articles and provides a convenient arrangement for carrying small article containers while retaining adequate space for carrying large articles.

It is another object of this invention to provide a fishing tackle box which permits small article containers to be carried in the tackle box in an orderly manner.

It is a further object of this invention to provide a container which has more useful area than prior containers and is particularly useful for carrying small articles.

In general, the foregoing and other objects will be carried out by providing a container comprising: first and second box halves each having sidewalls and a bottom; hinge means pivotally connecting an edge of one side of each box half so that the container can be swung between open and closed positions, whereby the first box half serves as the bottom of the container and the second box half serves as the top of the container; support means mounted within said first box half; tray means removably mounted on said support means; and a plurality of parallel, spaced-apart retainer means mounted on the inside of said tray means adapted to hold small article containers within said tray means.

BRIEF DESCRIPTION OF THE DRAWING

The invention will be described in connection with annexed drawing wherein.

DESCRIPTION OF THE PREFERRED EMBODIMENT

Figures 1, 2, 3:
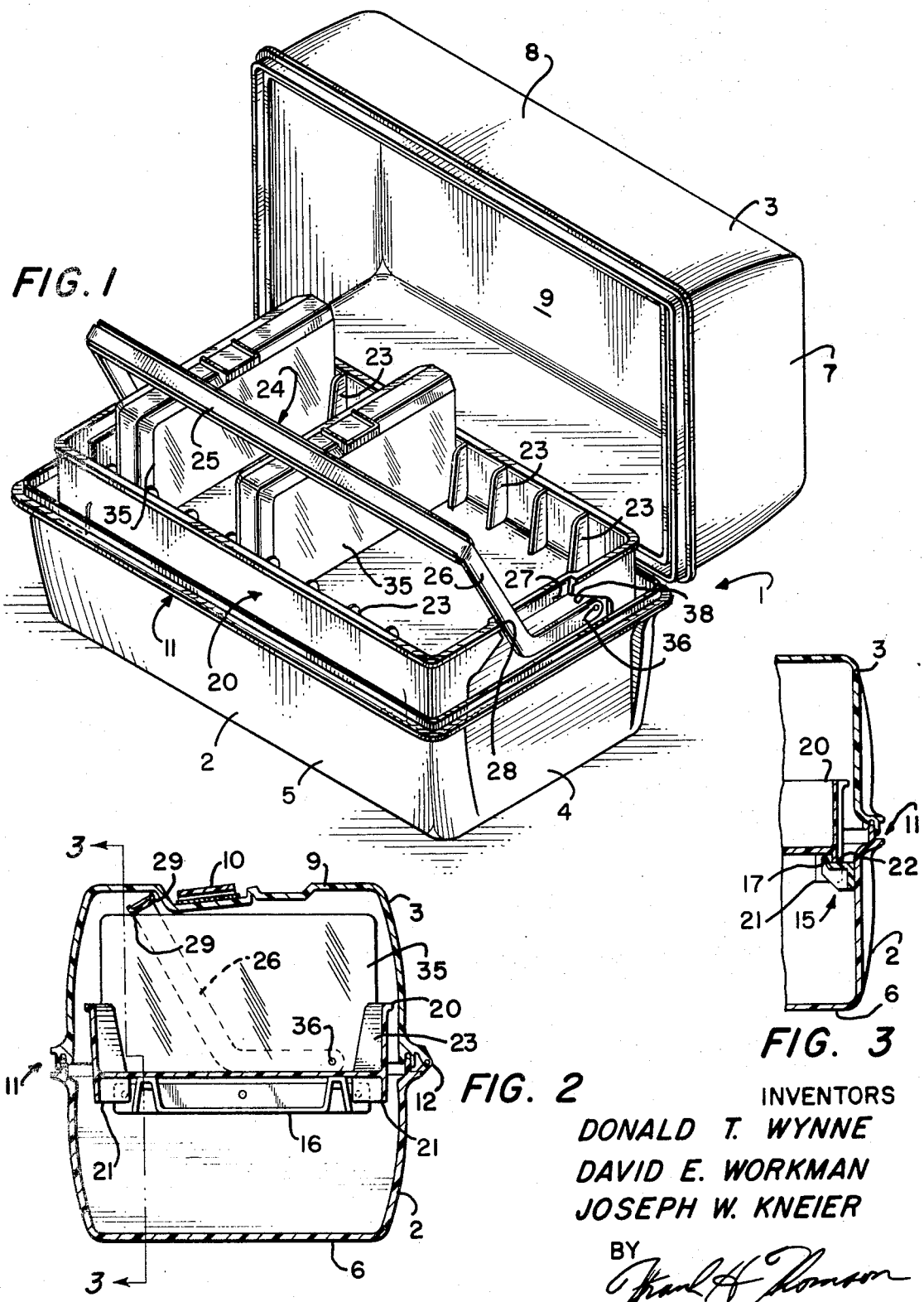
FIG. 1 is a perspective view of the container of the present invention with small article containers positioned therein.
FIG. 2 is a sectional view of the container of the present invention with the container in a closed position.
FIG. 3 is a fragmentary sectional view taken on the line 3—3 of FIG. 2 with the small article container removed.

Referring to the drawing, there is shown a container or case which is particularly adapted to be used as a fishing tackle box and may be constructed of any suitable material such as plastic. The container is generally indicated at 1 and is constructed of a pair of box halves 2 and 3. The first box half 2 includes end walls 4 and sidewalls 5 and a bottom 6 which serves as the bottom of the container. The second box half 3 includes end walls 7 and sidewalls 8 and a bottom 9 which serves as the top of the container. The two box halves 2 and 3 are substantially identical in configuration. The second box half 3 is provided with a suitably recessed carrying handle 10. The box halves are provided with a lip-sealing arrangement generally indicated at 11 around their edges so that the container will be substantially watertight when closed. A hinge 12 connects the box halves so that the container can be swung between open and closed positions.

A support means 15 is mounted within first box half 2 at a point near the upper edge of the box half. The support means 15 includes a pair of brackets 16 each mounted on an end wall 4 of the box half 2. Each bracket 16 includes a pair of upwardly projecting tabs 17.

A tray 20 is removably mounted within the first box half 2 on the support brackets 16. The tray 20 is provided with feet 21 at its corners and a downwardly projecting flange 22 on its ends. The feet 21 serve as supports for the tray when it is removed from the lower box half 2 and set aside. The feet 21 also act as a locking index to position and hold the tray 20 in place on the brackets 16 to thereby prevent lateral movement of tray relative to the case 1.

Opposite sidewalls of the tray 20 are provided with a plurality of parallel, spaced-apart ribs or spacers 23 which project inwardly from the sidewall tray 20. The ribs or spacers 23 on one side of the tray 20 are aligned with the ribs or spacers on the other side so that small article containers such as those shown at 35 in FIG. 1 can snugly fit between the ribs 20. Preferably, the containers 35 are compartmentalized so that small articles to be carried can be separated from each other.

A handle, generally indicated at 24 is pivotally connected to the tray 20. The handle includes an elongated bar 25 and a pair of downwardly extending L-shaped members 26. One leg of the L is connected to the bar 25 and the other leg is pivotally connected to the tray 20 at 36. The L-shaped members 26 fit with a recess 28 in the end walls of the tray 20. The recesses 27 are beveled at 28 to limit the pivotal movement of the handle 24. The underside of the handle is provided with a grip which is beveled at 29. The recess 2 is beveled as at 38 to limit the upward movement of the handle 24 to a position where the bar 25 is centered with respect to the tray 20. This insures proper balance of the tray when it is lifted out of the box half 2.

The handle 24 serves two functions. The first function is to assist the user in lifting the tray 20 out of the container 1. The second function is to assist in retaining the small article containers 35 within the tray 20 and container 1 particularly when the container is closed. This second function can best be seen by referring to FIG. is in the The bevel 29 of the handle 24 engages the small article containers 35 when the handle 24 is in the position shown in FIG. 2. When the container 1 is closed, the handle 24 cannot swing an appreciable distance away from the small article containers 35 because it is confined by the top of the container 1. In this position, therefore, if the container 1 is dropped for for some reason upset, the small article containers 35 will not become dislodged from their position in the tray 20. Thus, small articles which are carried in the containers 35 will not fall out and become entangled with each other.

When the container 1 is opened, the handle 24 can be swung out of the position shown in FIGS. 1 and 2 to permit the small article containers 35 to be easily removed from the tray 20. The user can then carry with him the container 35 which contains his favorite lures without carrying the whole box 1.

From the foregoing, it should be apparent that the objects of this invention have been carried out. A tackle box has been provided which permits an increased number of small articles to be carried in an orderly manner without interfering with the large article-carrying capacity of the tackle box. The tray 20 is suspended in the first box half 2 to provide ample room in the bottom for large articles such as fishing reels. The small article containers are held in an upright position to fully utilize the entire box top 3 and insure that a maximum number of small articles containers can be used. The small article containers are held in the box even if the container 1 is upset thus insuring an orderly tackle box.

We claim:

1. A container comprising:
   first and second box halves each having sidewalls and a bottom;
   hinge means pivotally connecting an edge of one side of each box half so that the container can be swung between open and closed positions, whereby the first box half serves as the bottom of the container and the second box half serves as the top of the container;
   support means mounted within said first box half;
   tray means removably mounted on said support means,
   a plurality of parallel, spaced-apart retainer means mounted on the inside of aid tray means adapted to hold small article containers with said tray means; and
   means pivotally mounted on said tray means for assisting said retainer means in holding small article containers within said tray means.

2. The container of claim 1 wherein said tray means includes means for limiting the pivotal movement of said handle.

3. The container of claim 1 wherein said support means includes a pair of support members mounted on opposite sidewalls of said first box half and spaced from the bottom of said first box half and said tray means extends above the edge of said first box half.

4. The container of claim 1 wherein said retainer means is an outwardly projecting rib and there are a plurality of ribs on opposite sidewalls of said tray means the the ribs on one sidewall are aligned with the ribs on opposite sidewall.

5. The container of claim 4 wherein said support means includes means for preventing lateral movement of said tray means.

6. A case having a top, bottom and sidewalls comprising:
   a pair of box halves each having sidewalls and a bottom;
   hinge means pivotally connecting an edge of one sidewall of each box half so that the case can be swung between open and closed positions;
   support means mounted within one of said box halves;
   tray means having sidewalls and a bottom removably mounted on said support means;
   retainer means mounted on opposite sidewalls of said support means; and
   at least one small article container removably mounted on said tray means adapted to be held by said retainer means and dimensioned to extend into the other box half when said case is closed.

7. The case of claim 6 further comprising handle means pivotally mounted on said tray means adapted to be pivoted between a position which permits removal of said small article container from said tray means and a position which substantially prevents movement of said small article container when said case is closed.

8. The case of claim 7 wherein said retainer means includes at least a pair of parallel, outwardly projecting ribs mounted on opposite sidewalls of said tray means and the ribs on one sidewall are aligned with the ribs on the opposite sidewall and said small article container is dimensioned to snugly fit between said ribs.

* * * * *